United States Patent
Ondrus et al.

(10) Patent No.: US 7,422,652 B2
(45) Date of Patent: Sep. 9, 2008

(54) METHOD OF MAKING A BODY PANEL ASSEMBLY

(75) Inventors: Dan Ondrus, Northville, MI (US); Scott Miller, Canton, MI (US); Jeff Crist, Sterling Heights, MI (US); Melissa Brutto, New Boston, MI (US)

(73) Assignee: Ford Motor Company, Dearborn, MI (US)

( * ) Notice: Subject to any disclaimer, the term of this patent is extended or adjusted under 35 U.S.C. 154(b) by 278 days.

(21) Appl. No.: 11/160,884

(22) Filed: Jul. 14, 2005

(65) Prior Publication Data
US 2005/0269027 A1   Dec. 8, 2005

Related U.S. Application Data

(63) Continuation-in-part of application No. 10/065,361, filed on Oct. 9, 2002, now Pat. No. 7,115,322.

(60) Provisional application No. 60/328,456, filed on Oct. 10, 2001.

(51) Int. Cl.
| | |
|---|---|
| B65C 9/25 | (2006.01) |
| C09J 5/06 | (2006.01) |
| B29C 65/02 | (2006.01) |
| B29C 65/54 | (2006.01) |
| B32B 37/06 | (2006.01) |
| B60J 7/047 | (2006.01) |
| C09J 5/02 | (2006.01) |
| B60J 5/06 | (2006.01) |
| B60J 5/12 | (2006.01) |

(52) U.S. Cl. .................. 156/322; 156/196; 156/226; 156/295; 156/308.6; 296/146.11; 296/219; 296/220.01

(58) Field of Classification Search .................. 156/196, 156/226, 295, 308.6, 309.9, 320, 322; 296/146.1, 296/146.11, 191, 219, 220.1; 29/DIG. 1, 29/DIG. 3
See application file for complete search history.

(56) References Cited

U.S. PATENT DOCUMENTS

| | | | |
|---|---|---|---|
| 1,804,658 | A | 5/1931 | Tarbox |
| 3,680,910 | A | 8/1972 | Stanner |
| 3,861,339 | A | 1/1975 | Aida et al. |
| 3,862,490 | A | 1/1975 | Tsuneishi et al. |
| 3,909,918 | A | 10/1975 | Takizawa et al. |
| 3,909,919 | A | 10/1975 | Miyabayashi et al. |
| 4,227,824 | A | 10/1980 | Ikawa |
| 4,477,304 | A | 10/1984 | Westermann |

(Continued)

FOREIGN PATENT DOCUMENTS

EP    0 346 920 B1    12/1989

(Continued)

Primary Examiner—Philip C Tucker
Assistant Examiner—Sonya Mazumdar
(74) Attorney, Agent, or Firm—Raymond L. Coppiellie; Brooks Kushman P.C.

(57) ABSTRACT

A method of manufacturing a body panel assembly for a vehicle. The method includes providing first and second panels, applying an adhesive, positioning the first and second panels, hemming the first and second panels together to form a subassembly, applying a coating to at least a portion of the subassembly, and heating the subassembly to at least partially melt the adhesive.

20 Claims, 3 Drawing Sheets

U.S. PATENT DOCUMENTS

| | | | |
|---|---|---|---|
| 4,549,949 A | 10/1985 | Guinn | |
| 4,719,689 A | 1/1988 | Yamamoto et al. | |
| 5,207,475 A | 5/1993 | Hellstroem | |
| 5,237,734 A | 8/1993 | Polon | |
| 5,273,606 A | 12/1993 | Greve et al. | |
| 5,362,120 A | 11/1994 | Cornille, Jr. | |
| 5,449,213 A | 9/1995 | Kiley et al. | |
| 5,470,416 A | 11/1995 | Herring, Jr. et al. | |
| 5,536,060 A | 7/1996 | Rashid et al. | |
| 5,587,042 A | 12/1996 | St. Denis | |
| 5,632,413 A | 5/1997 | Herring, Jr. et al. | |
| 5,749,992 A | 5/1998 | Eklund et al. | |
| 5,873,623 A | 2/1999 | Dunton et al. | |
| 5,897,796 A | 4/1999 | Forrest | |
| 6,000,118 A | 12/1999 | Biernat et al. | |
| 6,162,504 A | 12/2000 | Hubert et al. | |
| 6,324,880 B1 | 12/2001 | Nakamura | |
| 6,368,008 B1 | 4/2002 | Biernat et al. | |
| 6,523,244 B1 | 2/2003 | Bissonnette | |
| 6,528,176 B1 | 3/2003 | Asai et al. | |
| 6,696,147 B1 | 2/2004 | Herring, Jr. et al. | |
| 6,749,254 B1 * | 6/2004 | Kleven et al. | 296/191 |
| 6,776,449 B2 | 8/2004 | Komatsu et al. | |
| 2001/0029766 A1 | 10/2001 | Wiens | |
| 2003/0067187 A1 | 4/2003 | Curtiss et al. | |
| 2004/0163771 A1 | 8/2004 | Herring, Jr. et al. | |
| 2004/0245676 A1 | 12/2004 | Zaluzec et al. | |
| 2005/0098578 A1 * | 5/2005 | Szymanski | 222/145.1 |
| 2007/0278819 A1 * | 12/2007 | Seksaria et al. | 296/146.6 |

FOREIGN PATENT DOCUMENTS

| | | |
|---|---|---|
| EP | 0 727 343 B1 | 8/1996 |
| JP | 63-272428 | 11/1988 |
| JP | 2-254070 | 10/1990 |
| JP | 2000-177662 | 6/2000 |

\* cited by examiner

METHOD OF MAKING A BODY PANEL ASSEMBLY

CROSS-REFERENCE TO RELATED APPLICATIONS

This application is a continuation-in-part of U.S. application Ser. No. 10/065,361 filed Oct. 9, 2002, now U.S. Pat. No. 7,115,322, and hereby incorporated by reference in its entirety, which, in turn, claims the benefit of U.S. provisional application Ser. No. 60/328,456 filed Oct. 10, 2001.

BACKGROUND OF THE INVENTION

1. Field of the Invention

The present invention relates to a method for making a body panel assembly for a vehicle, such as a body panel assembly for a vehicle closure.

2. Background Art

Previously, vehicle body panels included a sealant that completely covered a hem area to prevent water from entering and collecting inside the hem, such as that disclosed in U.S. Pat. No. 4,719,689. In such body panels sealant was squeezed out during hemming and/or other manufacturing steps, resulting in waste and contamination of fixtures and other manufacturing equipment.

SUMMARY OF THE INVENTION

In at least one embodiment of the present invention, a method of manufacturing a body panel assembly for a vehicle is provided. The method includes the steps of providing first and second panels, applying an adhesive to a surface of the first panel, positioning the first and second panels, hemming the first and second panels together to form a subassembly, applying a coating to at least a portion of the subassembly, and heating the subassembly to at least partially melt the adhesive such that the adhesive bonds to the first and second panels.

In at least one other embodiment of the present invention, a method of manufacturing a closure panel assembly for a vehicle is provided. The method includes the steps of providing first and second panels having predetermined shapes, applying an adhesive to a surface of the first panel to define a footprint, positioning the first and second panels proximate each other such that the adhesive faces toward the second panel, hemming the first and second panels together to form a subassembly, applying a coating to at least a portion of the subassembly, and heating the subassembly to at least partially melt the adhesive such that adhesive bonds the first and second panels together and covers the footprint after the subassembly is heated.

In at least one other embodiment of the present invention, a method of manufacturing a closure panel assembly for a vehicle is provided. The method includes providing an inner panel having a plurality of dimples disposed near an end, providing an outer panel, applying an adhesive to an inner surface to the outer panel to define a footprint, positioning the inner panel near the outer panel such that the inner panel does not contact the adhesive, hemming the outer panel around the inner panel to form a subassembly, cleaning and electrocoating at least a portion of the subassembly, and heating the subassembly to at least partially melt the adhesive such that the adhesive flows into a gap separating the inner and outer panel to bond the first and second panels together. The adhesive may cover the footprint after the subassembly is heated to inhibit corrosion of the inner panel.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
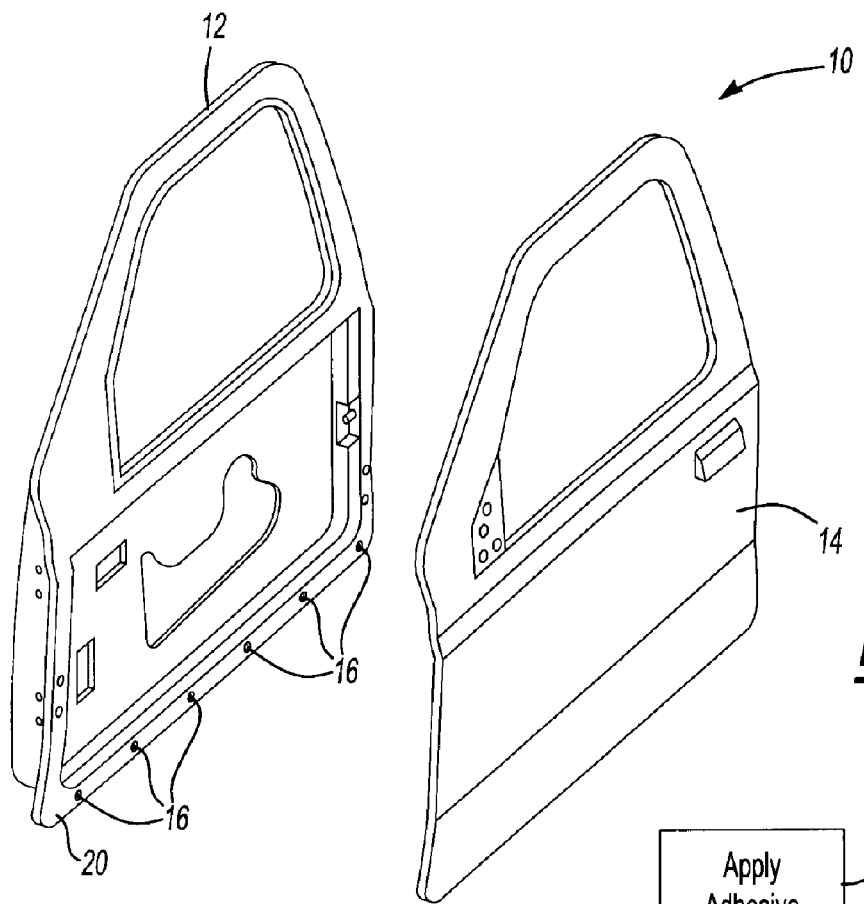
FIG. 1 is an exploded perspective view of an exemplary vehicle body panel assembly.

Referring to FIG. 1, an exploded view of an exemplary embodiment of a body panel assembly 10 for a vehicle is shown. In an automotive application, the body panel assembly 10 may be a body closure panel such as a door, hood, liftgate, tailgate, or decklid. In at least one embodiment, the body panel assembly 10 may include an inner panel 12 and an outer panel 14.

The inner and outer panels 12,14 may have any suitable configuration and may be made of any suitable material, such as a metallic material like aluminum, magnesium, titanium, or a steel like galvanized steel. Each panel 12,14 may be shaped or formed into a predetermined shape using any suitable fabrication process, such as stamping, drawing, hydroforming, or superplastic forming. In addition, each panel 12,14 may be a single piece or assembled from multiple pieces.

The inner and/or outer panels 12,14 may include a plurality of protrusions or dimples 16. The dimples 16 may be provided when the inner and/or outer panels 12,14 are shaped or formed or may be provided as a separate manufacturing operation. The dimples 16 may be disposed proximate a hem area, described in more detail below, to help space at least a portion of the inner and outer panels 12,14 away from each other. Moreover, the dimples 16 may be disposed proximate to or spaced apart from an end of at least one panel 12,14. In at least one embodiment, the dimples 16 are spaced apart from each other and provided on the inner panel 12 to provide a body panel assembly having an aesthetically pleasing appearance.

Figure 3:
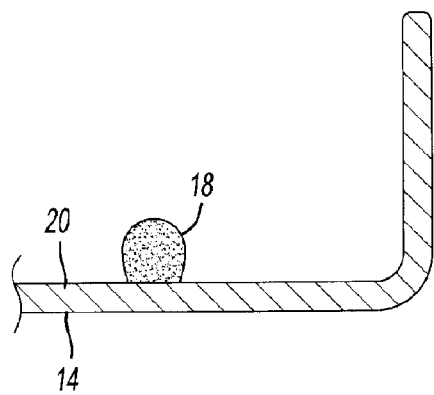
FIGS. 3-7 are section views of a portion of the vehicle body panel assembly made in accordance with the method of FIG. 2.
Figure 4:
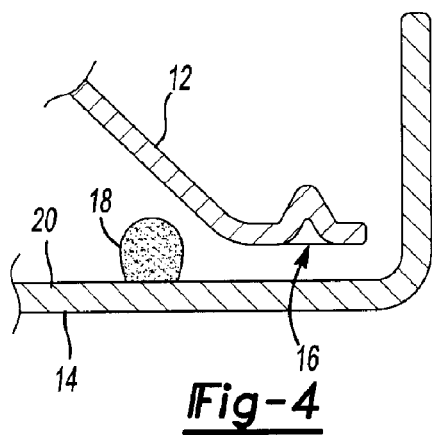
Figure 5:
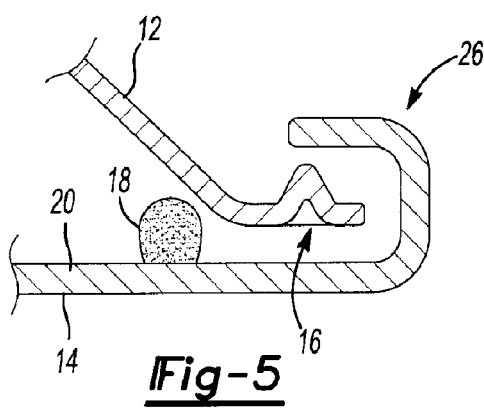
Figure 6:
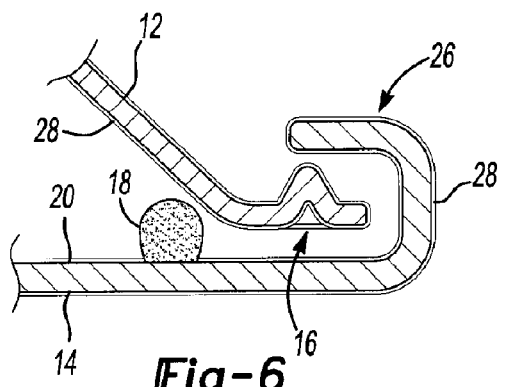

The inner panel 12 and the outer panel 14 may be at least partially joined together with an adhesive 18. The adhesive 18 may separate the inner and outer panels 12,14 from each other to inhibit vibration, rattling, or other undesirable noises. In addition, the adhesive 18 may inhibit water ingression and/or corrosion. The adhesive 18 may be of any suitable type, such as a rubber-based or an epoxy-based material like Uniseal™ product number 2345. Moreover, the adhesive 18 may be a one-part or multi-part reactant mixture and may be expandable or non-expandable. The adhesive 18 may be adapted to withstand washing, cleaning, and/or coating operations that are associated with body panel fabrication or assembly operations. The adhesive 18 may be applied to the inner panel 12 and/or the outer panel 14 in any suitable location and in any suitable manner as described in more detail below. For example, in the embodiment shown in FIG. 3, the adhesive 18 may be spaced apart from at least one end of the outer panel 14.

Figure 2:
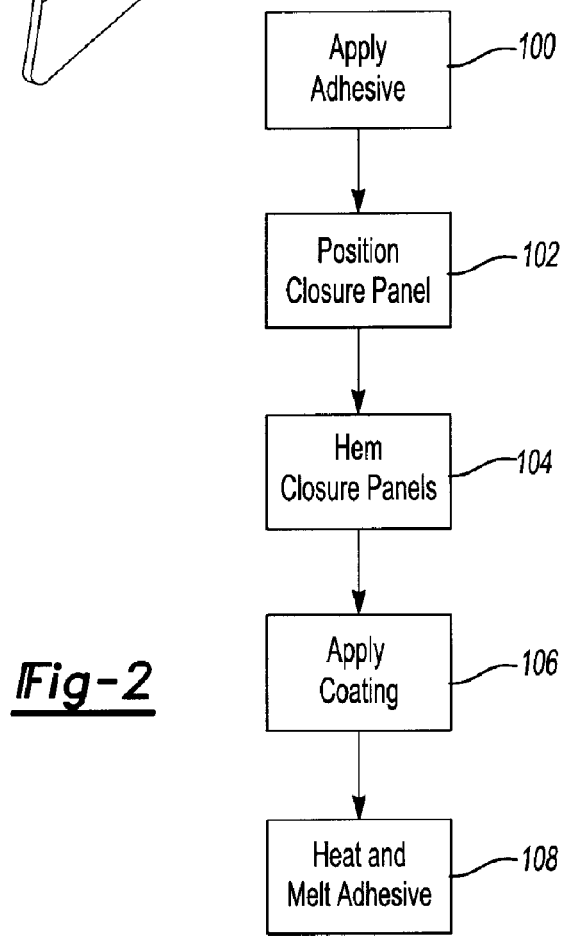
FIG. 2 is a flowchart of a method for making the vehicle body panel assembly.

Referring to FIG. 2, a flowchart of a method for making a body panel assembly is shown. For convenience, a graphical representation of the flowchart steps is shown in FIGS. 3-7. One of ordinary skill in the art will recognize that FIGS. 3-7 are merely exemplary and may be embodied in various and alternative forms.

For clarity, the flowchart in FIG. 2 does not include the shaping and/or forming operations associated with fabricating the inner and outer panels 12,14 since such operations were previously described above. One of ordinary skill in the art will recognize that these panel fabrication steps may be included as initial steps of the method of the present invention.

Figure 8:
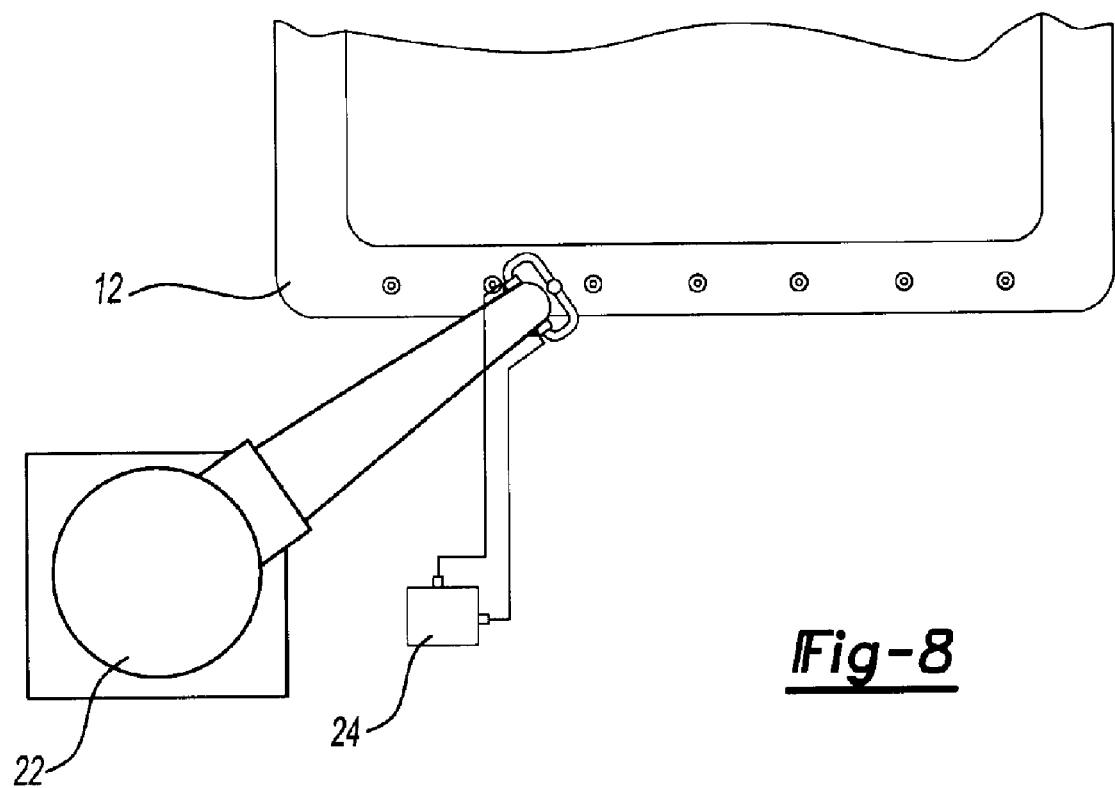
FIG. 8 is a plan view of an exemplary embodiment of a manipulator having a dispensing system.

At 100, the method begins by applying the adhesive material 18 proximate a surface of at least one panel. For example, a bead of adhesive 18 may be applied proximate an interior surface of the inner and/or outer panels 12,14. In the exemplary embodiment shown in FIG. 3, a bead or daub of adhesive material 18 is disposed proximate an interior surface 20 of the outer panel 14. Alternatively, the adhesive 18 may be disposed on another surface or another panel, such as the inner panel 12 in other embodiments of the present invention. Adhesive application may be accomplished manually or with automated or partially automated equipment. For instance, a manipulator, such as a robot 22, may be employed that is equipped with a dispensing system 24, such as that shown in FIG. 8 and disclosed in U.S. patent application Ser. No. 10/604,462, which is assigned to the assignee of the present invention and hereby incorporated by reference in its entirety.

At 102, at least one panel is positioned in a desired location. In the exemplary embodiment shown in FIG. 4, the inner panel 12 is positioned near the outer panel 14. Moreover, the inner panel 12 may be positioned such that it does not contact the adhesive material 18 and/or the outer panel 14 in an area near which hemming operations will be performed to facilitate subsequent cleaning, coating, and or phosphating operations as described in more detail below.

At 104, the panels are hemmed together. In the exemplary embodiment shown in FIG. 5, at least a portion of the outer panel 14 is hemmed around at least a portion of the inner panel 12. Alternatively, at least a portion of the inner panel 12 could be hemmed around the outer panel 14 in various embodiments. The panels 12,14 may contact each other or may contact dimples 16 on an opposing panel during and/or after the hemming operation. Alternatively, the panels 12,14 may be spaced apart after hemming is complete to provide a gap to allow cleaning, coating, and/or phosphating of both sides of the panels 12,14 and hem flange area 26. Optionally, fasteners such as rivets or clips may be used to join the inner panel 12 and the outer panel 14 together.

At 106, a coating 28 may be applied to the panels. This step may include washing and cleaning operations that prepare one or more surfaces for coating application. In the exemplary embodiment shown in FIG. 6, a coating 28 may be applied to external surfaces of the inner and outer panels 12,14. The coating 28 may inhibit corrosion, provide tinting, and/or to protect the body panel assembly 10 or other coating layers from the environment. For instance, one or more coating layers may be applied by any suitable painting or coating process, such as electrocoating.

Figure 7:
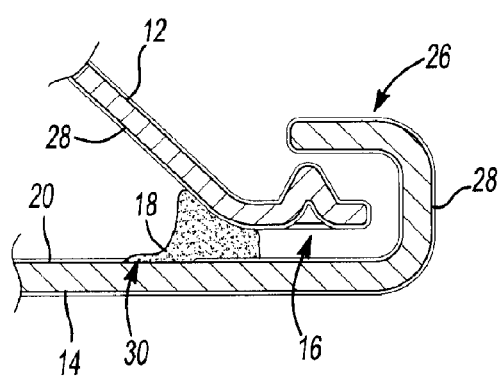

At 108, heat is applied to at least partially melt the adhesive 18. Heat may be provided by any suitable source, such as heating or curing ovens employed with the coating process. In other embodiments, the heat source may not be associated with the coating process. The adhesive 18 may contact and/or bond to another surface, such as the inner panel 12 as shown in FIG. 7, when heat is provided. Moreover, the adhesive 18 may remain attached to and cover its original application area or footprint 30. As such, the adhesive 18 provides corrosion protection for localized areas, such as the footprint 30, in which a coating layer is not applied. The adhesive 18 may help hold the panels together, provide corrosion protection, and/or provide cushioning or inhibit contact between the inner and outer panels 12,14 to reduce vibration and/or noise.

While the best mode for carrying out the invention has been described in detail, those familiar with the art to which this invention relates will recognize various alternative designs and embodiments for practicing the invention as defined by the following claims.

What is claimed is:

1. A method of manufacturing a body panel assembly for a vehicle, the method comprising:
   providing first and second panels;
   applying an adhesive to a surface of the first panel;
   positioning the first and second panels proximate each other such that the adhesive faces toward but does not contact the second panel;
   hemming the first and second panels together to form a subassembly such that the second panel does not contact the adhesive;
   applying a coating to at least a portion of the subassembly; and
   heating the subassembly to at least partially melt the adhesive such that the adhesive bonds to the first and second panels.

2. The method of claim 1 wherein the adhesive covers an adhesive application footprint after the subassembly is heated to inhibit corrosion of the first panel.

3. The method of claim 1 wherein the adhesive is applied with a robot having a dispensing system.

4. The method of claim 1 wherein the adhesive is an epoxy-based or rubber-based adhesive.

5. The method of claim 1 wherein the adhesive is an expandable adhesive.

6. The method of claim 1 wherein the adhesive is a non-expandale adhesive.

7. The method of claim 1 wherein the step of hemming the first and second panels together further comprises providing an open hem in which the first and second panels are spaced apart from each other.

8. The method of claim 1 wherein the second panel includes a dimple that spaces at least a portion of the first and second panels apart after the first and second panels are hemmed together.

9. The method of claim 8 wherein the dimple extends away from the adhesive when the subassembly is formed.

10. A method of manufacturing a closure panel assembly for a vehicle, the method comprising:
    providing first and second panels having predetermined shapes;
    applying an adhesive to a surface of the first panel to define a footprint;
    positioning the first and second panels proximate each other such that the adhesive faces toward the second panel and second panel does not contact the adhesive;
    hemming the first and second panels together to form a subassembly while the second panel does not contact the adhesive;

applying a coating to at least a portion of the subassembly while the second panel does not contact the adhesive; and heating the subassembly to cure the coating and at least partially melt the adhesive such that the adhesive bonds the first and second panels together;

wherein the adhesive covers the footprint after the subassembly is heated to inhibit corrosion of the first panel.

11. The method of claim 10 wherein the adhesive is applied to the first panel such that the adhesive is spaced apart from an end of the first panel.

12. The method of claim 10 wherein the second panel further comprises a dimple and the adhesive is spaced apart from the dimple when the first and second panels proximate each other.

13. The method of claim 10 wherein the second panel further comprises a dimple and the adhesive is spaced apart from the dimple when the adhesive is bonded to the first and second panels.

14. The method of claim 10 wherein the second panel further comprises an end and a dimple spaced apart from the end, wherein the adhesive is spaced apart from the end and the dimple after the adhesive is bonded to the first and second panels.

15. The method of claim 10 wherein the adhesive is applied as a continuous bead by a robot having a dispensing system.

16. A method of manufacturing a closure panel assembly for a vehicle, the method comprising:

providing an inner panel having a plurality of dimples disposed near an end;

providing an outer panel;

applying an adhesive to an inner surface of the outer panel to define a footprint;

positioning the inner panel near the outer panel such that the inner panel does not contact the adhesive;

hemming the outer panel around the inner panel when the inner panel does not contact the adhesive to form a subassembly;

cleaning and electrocoating at least a portion of the subassembly after hemming and when the inner panel does not contact the adhesive; and heating the subassembly to at least partially melt the adhesive such that the adhesive flows into a gap between the inner and outer panels to bond the first and second panels together;

wherein the adhesive covers the footprint after the subassembly is heated to inhibit corrosion of the inner panel.

17. The method of claim 16 wherein the adhesive is applied using a robot having a dispensing system.

18. The method of claim 16 wherein the end of the inner panel is spaced apart from the outer panel after the outer panel is hemmed around the inner panel.

19. The method of claim 16 wherein the dimple is spaced apart from the outer panel when the outer panel is hemmed around the inner panel.

20. The method of claim 16 wherein the adhesive inhibits vibration of the inner and outer panels.

\* \* \* \* \*